United States Patent [19]

Goossens

[11] 4,207,357

[45] Jun. 10, 1980

[54] METHOD FOR COATING A POLYCARBONATE ARTICLE WITH SILICA FILLED ORGANOPOLYSILOXANE

[75] Inventor: John C. Goossens, Mt. Vernon, Ind.

[73] Assignee: General Electric Company, Pittsfield, Mass.

[21] Appl. No.: 959,588

[22] Filed: Nov. 13, 1978

[51] Int. Cl.² .................... B05D 1/38; B05D 7/04; B05D 3/02

[52] U.S. Cl. ................... 427/162; 427/163; 427/164; 427/379; 427/387

[58] Field of Search ............... 427/162, 163, 164, 379, 427/387

[56] References Cited

U.S. PATENT DOCUMENTS

| | | | |
|---|---|---|---|
| 3,582,398 | 6/1971 | Ringler | 428/412 |
| 3,707,397 | 12/1972 | Gagnon | 428/412 |
| 3,968,305 | 7/1976 | Oshima et al. | 428/412 X |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 X |
| 4,027,073 | 5/1977 | Clark | 428/412 |
| 4,041,120 | 8/1977 | Oshima et al. | 264/171 |
| 4,045,602 | 8/1977 | Sommer et al. | 427/387 X |

Primary Examiner—James R. Hoffman
Attorney, Agent, or Firm—Myron B. Kapustij; William F. Mufatti

[57] ABSTRACT

A process for providing a durable and tenaciously adhered scratch, mar, abrasion, and chemical solvent resistant colloidal silica filled organopolysiloxane coating on a polycarbonate substrate. The process includes (i) applying a priming composition comprised of an emulsion of a thermosettable acrylic polymer and a hydroxy ether to a polycarbonate substrate; (ii) curing the thermosettable acrylic polymer thereby forming a primer layer on said substrate; (iii) applying onto the primed substrate a top coat composition containing a colloidal silica filled further curable organopolysiloxane; and, (iv) curing the silica filled organopolysiloxane.

8 Claims, No Drawings

METHOD FOR COATING A POLYCARBONATE ARTICLE WITH SILICA FILLED ORGANOPOLYSILOXANE

This invention relates to a method of applying a coating to a polycarbonate surface; more particularly, it relates to a method of providing a durably and tenaciously adhered colloidal silica filled organopolysiloxane coating on polycarbonate articles. The process includes priming the polycarbonate substrate with a primer composition comprised of an emulsion containing a thermosettable acrylic polymer and a hydroxy ether, curing the thermosettable acrylic polymer to form a thin primer layer, and coating the primed substrate with a silica filled organopolysiloxane.

BACKGROUND OF THE INVENTION

The use of transparent glazing material utilizing polycarbonate resin is a structural component for windows, windshields and the like is well known. While these polycarbonate resins are easily fabricated into the desired shape and have excellent physical and chemical properties, such as being less dense than glass and having more breakage resistance than glass, their abrasion, scratch and mar resistance is relatively low.

In order to overcome this relatively low scratch and mar resistance, various coatings have been applied to these polycarbonate resins. U.S. Pat. Nos. 3,451,838, 3,986,997 and 4,027,073 disclose organopolysiloxane coating compositions and techniques for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. In order to improve the adhesion of the organopolysiloxane coatings to the substrate, the prior art, as for example, U.S. Pat. No. 3,707,397 has suggested priming the substrate before application of the organopolysiloxane coatings thereon.

The difficulty in applying an adhesion promoting primer to the polycarbonate resides in the polycarbonate resins' susceptibility to attack and degradation by some of the more active chemical materials, either in the primer itself or the delivery system of the primer. Thus, the primer must not only act as an adhesion promotor between the organopolysiloxane and the polycarbonate, but must also be compatible with both the polycarbonate and the organopolysiloxane. Furthermore, not only must the primer itself be compatible with both the polycarbonate and the organopolysiloxane coating but the delivery system by which the primer is applied onto the polycarbonate must not deleteriously affect the polycarbonate. Since the prior art generally teaches the delivery of the primer as a solution of the primer material dissolved in an organic solvent, and since many of these organic solvents aggressively attack the polycarbonate, such a means of applying a primer to a polycarbonate is not very effective or practical in producing mar-resistant coated polycarbonate articles.

There thus exists a need for polycarbonate articles having uniformly, tenaciously and durably adhered scratch-, mar-, abrasion-, and chemical solvent resistant coatings thereon and for a method of applying such coatings, and it is a primary object of the present invention to provide such articles and an effective method for producing these articles.

DESCRIPTION OF THE INVENTION

This invention relates to colloidal silica filled organopolysiloxane coated polycarbonate articles having an adhesion promoting primer layer and to a process for producing these articles.

In the practice of the present invention, prior to the application of the silica filled organopolysiloxane coating to the polycarbonate surface, the surface is first primed by the application thereon of a primer composition comprised of an emulsion containing a thermosettable acrylic polymer and a hydroxy ether. The water and hydroxy ether portion of the primer emulsion composition are then evaporated off and the resulting film comprised of a thermosettable acrylic polymer is cured to provide a thermoset acrylic primer layer. The primed polycarbonate is then coated with a top coat composition containing colloidal silica and a further curable organopolysiloxane and the resulting deposit of colloidal silica filled further curable organopolysiloxane is further cured thereby providing a silica filled thermoset organopolysiloxane coating.

The carbonate polymer, preferably an aromatic carbonate polymer, of the instant invention has recurring units of the formula

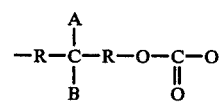  I.

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. Nos. 3,161,615; 3,220,973; 3,312,659; 3,312,660; 3,313,777; 3,666,614; and 3,989,672, among others, all of which are incorporated herein by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

The preferred polycarbonate resins may be derived from the reaction of bisphenol-A and phosgene. These polycarbonates have from 10–400 recurring units of the formula:

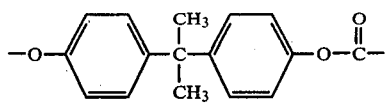

II.

The polycarbonate should have an intrinsic viscosity between 0.3 and 1.0, preferably from 0.40 to 0.65 as measured at 25° C. in methylene chloride.

The primer emulsion composition of the present invention is comprised of (i) a thermosetting acrylic emulsion; and (ii) a hydroxy ether. The thermosettable arcylic polymer emulsion is comprised of thermosettable acrylic polymers dispersed in water. The polymers are generally in the form of discrete spherical particles (approximately 0.1 micron in diameter) dispersed in water. Since the polymer particles are separate from the continuous aqueous phase, the viscosity of the dispersion or emulsion is relatively independent of the polymers molecular weight. Consequently, the emulsion can contain polymers of high molecular weight and yet have a relatively low viscosity.

The thermosettable acrylic polymers present in the emulsion are well known in the art. Exemplary thermosettable acrylics which may be employed in the practice of this invention are set forth, for example, in *Encyclopedia of Polymer Science and Technology,* Vol. 1, Interscience Publishers, John Wiley & Sons, Inc., copyright 1964, at page 273 et seq., and in *Chemistry of Organic Film Formers,* by D. H. Solomon, John Wiley & Sons, Inc., 1967 at page 251 et seq. and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and, (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; inter-reaction between carboxyl and isocyanate groups; reactions between hydroxyl, for example, polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacylate, allyl glycidyl ether, dimethylaminoethyl methacrylate, vinyl pyridine, tert-butylaminoethyl-methylacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts to about 99 parts and, more typically, between about 80 parts to about 97 parts.

These thermosetting acrylic polymer emulsions are commercially available and are sold by Rohm & Haas, Philadelphia, PA, as their Rhoplex ®. Generally, these emulsions contain from about 40 to about 55% solids. However, in formulating the primer compositions, it has been found desirable that the compositions contain from about 1 to about 10% by weight solids. Thus, it is generally necessary to dilute these commercially available emulsions by the addition of water thereto.

A second component of the primer compositions of the instant invention is a hydroxy ether. These hydroxy ethers are represented by the general formula $$R^1-O-R^2-OH \qquad \text{III.}$$

wherein $R^1$ is an alkyl radical containing from 1 to about 6 carbon atoms and $R^2$ is an alkylidene radical containing from 1 to about 6 carbon atoms, provided that the sum of the carbon atoms present in $R^1$ and $R^2$ is from 3 to about 10.

Generally, the primer composition of the present invention contains, in % by weight, from about 1 to about 10% acrylic solids, from about 20 to about 45% of hydroxy ether, and from about 45 to 79% water. The presence of the aforedescribed hydroxy ether in amounts of from about 20 to about 45% by weight of the primer composition is critical to the satisfactory performance of the primer composition in forming an effective primer layer. If no hydroxy ether is present, or if an amount of hydroxy ether less than about 20 weight % is present, the primer composition does not flow evenly over the polycarbonate substrate, i.e., there is uneven distribution of the composition over the substrate with excessive concentrations of the composition in certain areas and the total absence of the primer composition in other areas. This results in an unevenly distributed and non-uniform primer layer being formed which in turn results in inferior adhesion of the silicone top coat and in a streaked appearance of the final product. If too much of the hydroxy ether is present, i.e., amounts greater than about 45 weight percent, coagulation and precipitation of the solids will occur.

The concentration of the acrylic solids in the primer emulsion compositions is generally quite important. Silica filled organopolysiloxane top coats applied onto the thermoset acrylic primers derived from primer emulsion compositions containing less than about 1 weight percent thermosettable acrylic solids or more than about 10 percent acrylic solids generally tend to have a marked decrease in durability of adhesion, especially after exposure to weathering, and abrasion resistance as compared with top coats applied onto thermoset acrylic primers derived from primer emulsion compositions containing from about 1 to about 10 weight percent of a thermosettable acrylic polymer. Primer emulsion compositions containing from about 2 to about 6 weight percent of thermosettable acrylic polymer solids are preferred.

In the method of the present invention, a thin layer of the primer composition is applied onto the polycarbonate substrate by any of the well known methods such as spraying, dipping, roll-coating and the like. Generally, the primer composition is applied in an amount sufficient to provide a cured primer film of from about 0.01 to about 0.1 mil thick, preferably from about 0.02 to about 0.08 mil thick. The water and hydroxy ether are then evaporated off, as by air drying or mild heating, to leave an even and uniform layer of thermosettable acrylic. This acrylic is then cured or thermoset by heating at a temperature of from about 90° to about 130° C., thereby forming a cured primer layer.

A silica filled organopolysiloxane coating is then applied onto this thermally cured primer layer. In the practice of this invention, a silica filled organopolysiloxane coating composition containing a further curable organopolysiloxane and colloidal silica is applied onto the cured primer and is then cured to form a thermoset silica filled organopolysiloxane coating.

The silica filled further curable organopolysiloxane top coat composition is described in U.S. Pat. Nos. 3,986,997 and 4,027,073 and comprises a dispersion of colloidal silica in a lower aliphatic alcohol-water solution of the partial condensate of a silanol having the formula $$R^3Si(OH)_3 \qquad\qquad IV.$$

wherein R is selected from the group consisting of alkyl radicals containing from 1 to 3 carbon atoms, the vinyl radical, the 3,3,3-trifuloropropyl radical, the gamma-glycidoxypropyl radical and the gamma-methacryloxypropyl radical, with at least 70 percent by weight of said silanol being $Ch_3Si(OH)_3$. This composition generally contains from about 10 to abut 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of CH3 and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si-bonding. The cndensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO—units. During curing of the top coating composition on the primer, these residual hydroxyl groups condense to give a silsesquioxane, $R^3SiO_{3/2}$.

The silica component of the top coat composition is present in the form off collodial silica. Aqueous colloidal silica dispersions generally have a particle size in the range of 5 to 150 millimicrons in diameter. These silica dispersions are prepared by methods well known in the art and are commerically available. It is preferred to use colloidal silica having a particle size in the range of 10 to 30 millimicrons in diameter in order to obtain dispersions having a greater stability and to provide top coatings having superior optical properties.

The silica filled organopolysiloxane top coat compositions are prepared by adding trialkoxysilanes to colloidal silica hydroxol and adjusting the pH to a range of 3.0 to 6.0 by the addition of acid. As mentioned previously, the acid can be added to either the silane or the silica hydroxol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible to polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si—O—Si bonding. The condensation is not complete, resulting in a siloxane having an appreciable quantity of siliconbonded hydroxyl group. This aged, silica filled further curable organopolysiloxane top coat composition is then applied onto the primed polycarbonate by any of the commonly known methods such as dipping, spraying, flow-coating and the like. After the top coat composition is applied to the primed polycarbonate, the coated polycarbonate is air dried to evaporate off the volatile solvents from the top coat compositions. Thereafter, heat is applied to cure the top coat. During curing, the residual hydroxyls of the siloxane condense to give a silsesquioxane, $R^3SiO_{3/2}$. The result is a silica filled cross-linked organopolysiloxane top coat which is tenaciously adhered to the substrate and is highly resistant to scratching, abrasion, chemical solvents and marring. Generally, the top coat contains from about 10 to about 70 weight percent silica and from about 30 to about 90 weight percent of the organopolysiloxane present as the silsesquioxane, $R^3SiO_{3/2}$.

The thickness of the top coat generally is dependent upon the method of application and upon the weight percent solids present in silica filled further curable organopolysiloxane top coat composition. In general, the higher the percent solids, and the longer the application time, the greater the thickness of the top coat. It is preferred that the cured top coat have a thickness of from about 0.1 to about 0.5 mils, more preferably from 0.15 to about 0.4 mils, and most preferably from about 0.2 to about 0.25 mils.

Thus, the process of the present invention comprises the steps of: (i) applying onto the polycarbonate substrate a primer emulsion composition containing (a) from about 1 to about 10 weight % of a thermosettable acrylic polymer; (b) from about 20 to about 45 weight % of a hydroxy ether, and (c) from about 45 to about 79 weight % water; (ii) evaporating off a substantial portion of the water and hydroxy ether from said composition; (iii) thermally curing the resulting layer of thermosettable acrylic to form a primer layer comprised of a thermoset acrylic; (iv) applying a silica filled further curable organopolysiloxane top coat composition onto said cured primer layer, the top coat composition comprising a dispersion of colloidal silica in a lower alkanol-water solution of the partial condensate of a silanol of the formula $R^3Si(OH)_3$ in which $R^3$ is selected from the group consisting of alkyl radicals containing from 1 to 3 carbon atoms, the vinyl radical, the 3,3,3- trifluoropropyl radical, the gamma-glycidoxypropyl radical and the gamma-methacryloxypropyl radical, at least 70 weight percent of the silanol being $CH_3Si(OH)_3$; (v) evaporating off a substantial portion of the volatile solvents present in the top coat composition; and (vi) curing the top coating by the application of heat thereto to form a silica filled thermoset organopolysiloxane, i.e., a silsesquioxane.

PREFERRED EMBODIMENT OF THE INVENTION

In order that those skilled in the ary may better understand how the present invention may be practiced, the following examples are given by way of illustration and not be way of limitation.

Example 1

An aromatic polycarbonate is prepared by reacting 2,2-bis (4-hydroxyphenyl) propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛in. thick. The test panels are subjected to an abrasion test. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 500 cycles, cleaned with isopropanol, and the % Haze is remeasured at the same four places. The four differences in % Haze are calculated and averaged to give the Δ% Haze. The results are set forth in Table I.

Example 2

This example illustrates the preparation of a primer composition outside the scope of the present invention which produces inferior results when applied onto a polycarbonate substrate. To 10 grams of Rhoplex® AC-658, a thermosetting acrylic emulsion containing from about 46.5 to about 47.5% total solids, sold by Rohm and Haas, Philadelphia, PA, are added 84 grams of water. The resulting mixture is thoroughly stirred and a polycarbonate test panel prepared substantially in accordance with Example 1 is coated with this primer composition. The coated polycarbonate panel is air dried to evaporate off the water. The resultant solid layer is non-uniform with heavy white streaks. This solid layer is then cured to a thermoset primer about 0.03 mil thick by heating for one hour at 120° C.

Example 3

This example also illustrates the preparation of a primer composition outside the the scope of the present invention which produces inferior results when applied onto a polycarbonate substrate. To 10 grams of Rhoplex® AC-658 are added 74 grams of water and 10 grams of butoxy ethanol. The resulting mixture is thoroughly stirred and a polycarbonate test panel prepared substantially in accordance with Example 1 is coated with this primer composition. The coated polycarbonate panel is air dried to evaporate off the water and the butoxy ethanol. The resultant solid layer contains moderate white streaking. This solid layer is then cured to a thermoset primer layer approximately 0.03 mil thick by heating for one hour at 120° C.

Example 4

This example illustrates the preparation of a primer composition of the present invention. To 10 grams of Rhoplex® AC-658 are added 64 grams of water and 20 grams of butoxy ethanol. The resulting mixture is thoroughly stirred and a polycarbonate test panel prepared substantially in accordance with Example 1 is coated with this primer composition. The coated polycarbonate panel is air dried to evaporate off the water and the butoxy ethanol. The resultant solid layer is uniform and clear. This solid layer is then cured to a thermoset primer layer about 0.03 mil thick by heating for one hour at 120° C.

Example 5

This example illustrates the preparation of a primer composition of the present invention. To 10 grams of Rhoplex® AC-658 are added 54 grams of water and 30 grams of butoxy ethanol. The resulting mixture is thoroughly stirred and a polycarbonate test panel prepared substantially in accordance with Example 1 is coated with this primer composition. The coated polycarbonate panel is air dried to evaporate off the water and the butoxy ethanol. The resultant solid layer is uniform and clear. This solid layer is then cured to a thermoset primer layer about 0.03 mil thick by heating for one hour at 120° C.

Example 6

This example illustrates the preparation of a primer composition of the present invention. To 10 grams of Rhoplex ® AC-658 are added 44 grams of water and 40 grams of butoxy ethanol. The resulting mixture is thoroughly stirred and a polycarbonate test panel prepared substantially in accordance with Example 1 is coated with this primer composition. The coated polycarbonate panel is air dried to evaporate off the water and butoxy ethanol. The resultant solid layer is uniform and clear. This solid layer is then cured to a thermoset primer layer about 0.03 mil thick by heating at 120° C. for one hour.

Example 7

This example illustrates the preparation of a primer composition outside the scope of the present invention which produces inferior results when applied onto a polycarbonate substrate. To 10 grams of Rhoplex ® AC-658 are added 34 grams of water and 50 grams of butoxy ethanol. The resulting mixture is thoroughly stirred. This mixture is swollen and a viscosity buildup is noted. A polycarbonate test panel prepared substantially in accordance with Example 1 is coated with this primer composition. The coated polycarbonate panel is air dried to evaporate off the water and butoxy ethanol. The resultant solid layer is heavily rippled. This solid layer is then cured to a thermoset primer layer about 0.03 mil thick by heating at 120° C. for one hour.

A silica filled organopolysiloxane top coat composition containing 37 weight percent solids, 50% of which are $SiO_2$, is formulated by adding a commercially available aqueous dispersion of colloidal silica, having $SiO_2$ of approximately 13–14 millimicron particle size, to methyltrimethoxysilane which has been acidified by the addition of 2.5 weight percent glacial acetic acid. This composition is mixed for four hours and is then adjusted to a pH of 3.9 by addition of more glacial acetic acid. This acidified composition is then diluted to 18% solids by the addition of isopropanol and aged for four days to ensure formation of the partial condensate of $CH_3Si(OH)_3$.

Example 8

Primed polycarbonate panels are prepared substantially in accordance with Example 2 and are flow-coated with a silica filled organopolysiloxane top coat composition prepared substantially in accordance with the procedure as set forth above. These panels are air dried for 30 minutes to evaporate the solvent present in the top coat composition, followed by a one-hour bake at 120° C. to cure the further curable organopolysiloxane. These primed top coated panels are then subjected to the afore-described abrasion test and to scribed adhesion and sunlamp aging tests. The scribed adhesion test consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off. A sample fails the adhesion test if any of the squares in the grid are pulled off. The sunlamp aging test is used to ascertain the durability of adhesion of the silica filled organopolysiloxane coating on the polycarbonate substrate. This test is one wherein the sample undergoes severe exposure to ultraviolet radiation. In the sunlamp aging test, the samples are exposed to an RS-sunlamp, and after exposure for a predetermined period of time are removed and subjected to the adhesion test. The results of these tests are set forth in Tables I, II and III, respectively.

Example 9

Unprimed polycarbonate test panels are prepared in accordance with Example 1 and are flow-coated with a silica filled organopolysiloxane top coat composition prepared substantially in accordance with the procedure set forth above. The coated unprimed panels are air dried for 30 minutes to evaporate the solvent, followed by a one-hour bake at 120° C. to cure the further curable organopolysiloxane. These coated unprimed panels are subjected to the afore-described adhesion and sunlamp aging tests and the results are set forth in Tables II and III.

Example 10

Primed polycarbonate panels are prepared substantially in accordance with Example 5 and are flow-coated with a silica filled organopolysiloxane top coat composition prepared substantially in accordance with the procedure as set forth above. These panels are air dried for 30 minutes to evaporate the solvent present in the top coat composition, followed by a one-hour bake at 120° C. to cure the further curable organopolysiloxane. These primed, top coated panels are then subjected to the afore-mentioned abrasion, adhesion and sunlamp aging tests and the results are set forth in Tables I, II and III, respectively.

TABLE I

| Abrasion Resistance | |
|---|---|
| Example No. | % Haze |
| 1 | 34 |
| 8 | 4.9 |
| 10 | 3.9 |

TABLE II

| Adhesion Test | |
|---|---|
| Example No. | Results |
| 8 | Failed |
| 9 (unprimed) | Marginal* |
| 10 | Pass |

*The results of the adhesion test were uneven. That is to say, samples failed the adhesion test while other samples passed the adhesion test.

TABLE III

| Sunlamp Aging Test | |
|---|---|
| Example No. | No. of hours exposure to RS-sunlamp at which sample fails adhesion test |
| 8 | 24 hours |
| 9 (unprimed) | 36 hours |
| 10 | 500 hours |

As can be seen from the foregoing Examples and Tables II–III, the adhesion and durability of the silica filled organopolysiloxane top coat which is applied onto the primer system of the present invention is superior to that of the same top coat applied to either an unprimed polycarbonate substrate or to a polycarbonate substrate primed with a primer system falling outside the scope of the instant invention. Thus, for example, while the abrasion resistance of a polycarbonate panel coated and primed in accordance with the method of the present invention, i.e., Example 10, is approximately the same as that of a polycarbonate panel primed with a primer system outside the scope of the present invention, i.e., Example 8, the adhesion and durability of the organopolysiloxane coating on a primer of the present invention are markedly superior to the adhesion and durability of an unprimed polycarbonate substrate, i.e., Example 9, or a polycarbonate substrate primed with a primer falling outside the scope of the instant invention, i.e., Example 8.

Examples 11–17

These examples illustrate the criticality of the thermosettable acrylic polymer concentration in the primer emulsion composition. Samples of a primer emulsion composition are prepared containing 3, 4, 5, 7, 10 and 15 weight % thermosettable acrylic polymer with a constant butoxy ethanol to water ratio of 33/67. These primer compositions are applied onto polycarbonate test panels prepared substantially in accordance with Example 1 and the coated tests panels are air dried to evaporate off the water and butoxy ethanol. The test panels are then baked at 120° C. for one hour to cure the thermosettable acrylic polymer. The primed polycarbonate test panels are flow-coated with a silica filled organopolysiloxane top coat composition prepared substantially in accordance with the procedure as set forth above. These panels are air dried for 30 minutes to evaporate the solvent present in the top coat composition, followed by a one-hour bake at 120° C. to cure the further curable organopolysiloxane. These primed top coated panels are then subjected to the afore-described abrasion, adhesion and sunlamp aging tests and to a humidity test and the results are tabulated in Table IV. The humidity test involves subjecting samples to a number of humidity oven cycles, and after each cycle subjecting said samples to the afore-described adhesion test. One humidity oven cycle consists of placing the sample into a cabinet maintained at 99% relative humidity and 80°–85° F., raising the temperature to 140° F., maintaining the temperature at 140° F. for 6 hours, and thereafter gradually lowering the temperature, over a period of 10 hours, to 80°–85° F., and maintaining the temperature at 80°–85° F. for an additional 8 hours, at which time one cycle is complete and the sample is removed and undergoes the adhesion test.

falling outside the scope of the instant invention, i.e., Example 17, then the abrasion resistance and durability of a silica filled organopolysiloxane top coat applied onto a primer of the instant invention, i.e., Examples 11–16.

From the foregoing disclosure, it is quite evident that the instant invention provides a method for applying a uniform, tenaciously adhered, and durable silica filled organopolysiloxane top coat onto a polycarbonate panel.

The foregoing disclosure of this invention is not to be considered as limiting, since many variations may be made by those skilled in the art without departing from the scope of spirit of the foregoing description.

What I claim as new and desire to secure by Letters Patent of the United States is:

1. A method for producing a polycarbonate article having improved mar, abrasion, scratch and chemical solvent resistance comprising:
(i) applying onto a polycarbonate substrate a primer emulsion composition containing, in percent by weight, (a) from about 1 to about 10 percent of a thermosettable acrylic polymer, (b) from about 20 to about 45% of a hydroxy ether, and (c) from about 45 to about 79 percent of water;
(ii) evaporating off a substantial portion of said water and hydroxy ether from said primer emulsion composition to form a thin layer comprised of thermosettable acrylic;
(iii) thermally curing said thermosettable acrylic to form a thermoset acrylic primer layer;
(iv) applying onto said cured primer layer a silica filled further curable organopolysiloxane top coat composition comprising a dispersion of colloidal silica in a lower alkanol-water solution of the partial condensate of a silanol of the formula RSi(OH)$_3$ wherein R is a radical selected from the group consisting of an alkyl radical containing 1 to 3 carbon atoms, the vinyl radical, the 3,3,3-trifluoropropyl radical, the gammaglycid oxypropyl radical and the gamma-methacryloxypropyl radical, at least 70 weight percent of said silanol being CH$_3$Si(OH)$_3$, said composition containing sufficient acid to provide a pH in the range of 3.0 to 6.0;
(v) evaporating off a substantial portion of the volatile solvents from said top coat composition thereby forming a layer comprised of a silica filled partial condensate of said silanol; and,
(iv) thermally curing said silica filled partial condensate of said silanol.

2. The method of claim 1 wherein said hydroxy ether

TABLE IV

| Example No. | Wt. % acrylic solids in primer emulsion comp. | Thickness of cured primer layer in mils | % Haze | No. of hours hours exposure to to RS-sunlamp at which sample fails adhesion test | No. of humidity oven cycles after which sample fails adhesion test |
|---|---|---|---|---|---|
| 9 | No primer | — | — | 36 | 1 |
| 11 | 2 | 0.01 | 6.1 | 240 | 7 |
| 12 | 3 | 0.015 | 4.0 | 550 | 14 |
| 13 | 4 | 0.02 | 3.5 | over 1,000 | 21 |
| 14 | 5 | 0.03 | 3.6 | over 1,000 | 21 |
| 15 | 7 | 0.04 | 3.8 | 820 | 21 |
| 16 | 10 | 0.07 | 5.7 | 420 | 7 |
| 17 | 15 | 0.13 | 9.0 | 48 | 3 |

As can be seen from Table IV, the durability of the top coat as well as the abrasion resistance of said top coat is markedly inferior when applied onto a primer is represented by the general formula

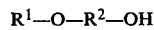

$R^1$—O—$R^2$—OH wherein $R_1$ is an alkyl radical containing from 1 to about 6 carbon atoms and $R^2$ is an alkylidene radical containing from 1 to about 6 carbon atoms, provided that the sum of the carbon atoms present in $R^1$ and $R^2$ is from 3 to about 10.

3. The method of claim 1 wherein said cured primer layer has a thickness of from about 0.01 to about 0.1 mil.

4. The method of claim 3 wherein said cured primer layer has a thickness of from about 0.02 to about 0.08 mil.

5. The method of claim 1 wherein said polycarbonate article is in the form of a sheet.

6. The method of claim 5 wherein said sheet is transparent.

7. The method of claim 6 wherein said cured primer layer is transparent.

8. The method of claim 7 wherein said silica filled organopolysiloxane coating is transparent.

* * * * *